Jan. 26, 1965   F. E. SEESTROM   3,167,680
DUAL SWEEP GENERATOR
Filed Nov. 8, 1961   3 Sheets-Sheet 3
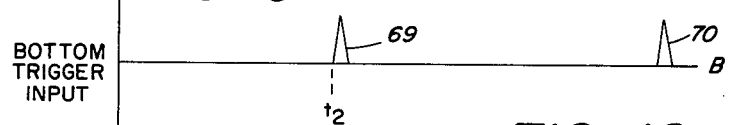
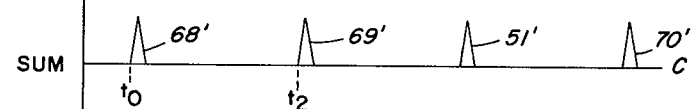
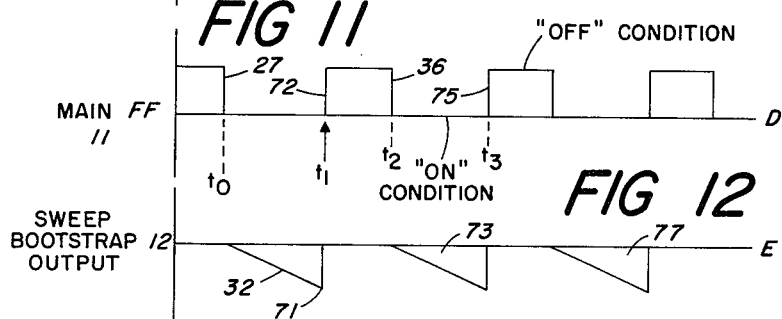
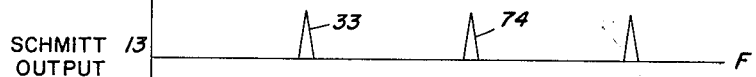
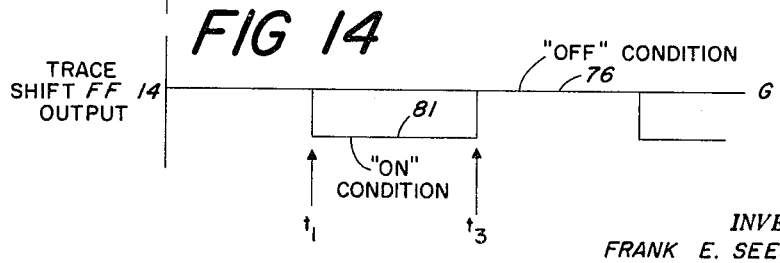
INVENTOR.
FRANK E. SEESTROM
BY Moody and Phillion
ATTORNEYS

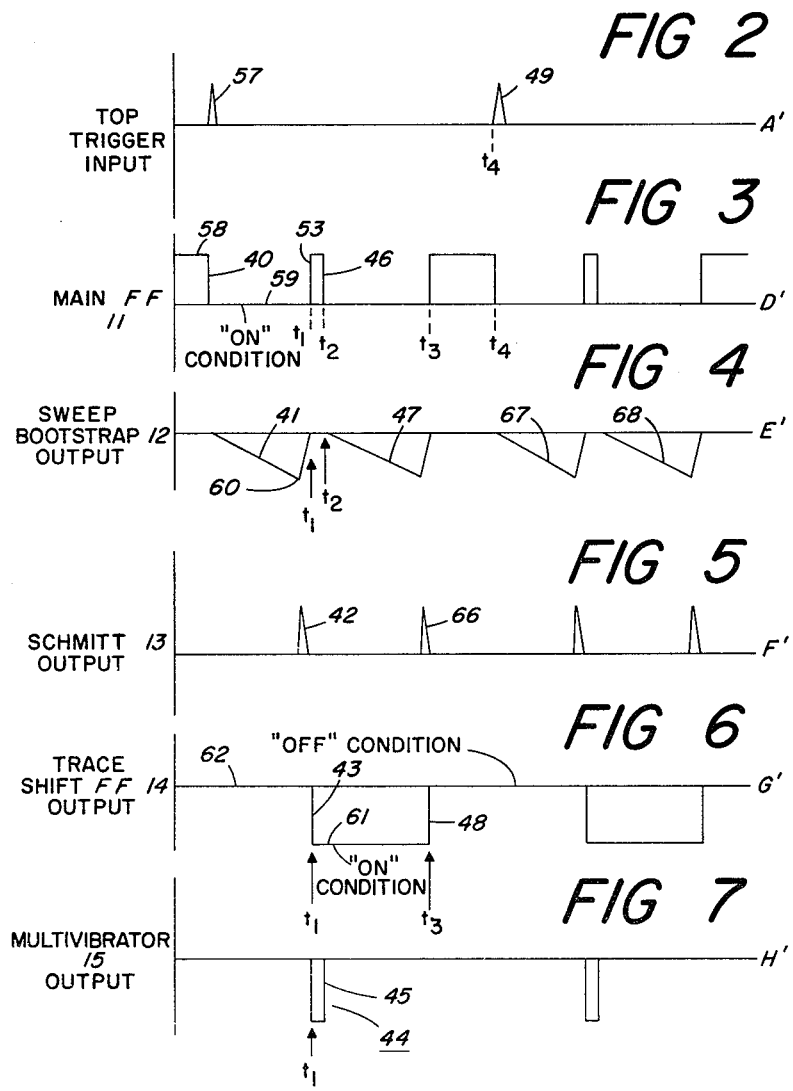

United States Patent Office 3,167,680
Patented Jan. 26, 1965

3,167,680
DUAL SWEEP GENERATOR
Frank E. Seestrom, Dallas, Tex., assignor to Collins Radio Company, Cedar Rapids, Iowa, a corporation of Iowa
Filed Nov. 8, 1961, Ser. No. 151,061
5 Claims. (Cl. 315—23)

This invention relates generally to means for exhibiting waveforms on a cathode ray tube screen and, more particularly, to circuit means which will selectively permit either a time continuous two-level scanning of a waveform or a non time continuous two-level scanning of two different waveforms simultaneously.

In some circuit applications it is desirable to exhibit on the screen of a cathode ray tube a series of pulses or other waveforms of such a length that two scans of the screen at different levels are required in order to accommodate the signal. In some occasions it is desirable that the two scans each represent a separate and time independent group of pulses, and in other instances one level of scanning will represent one segment of the train of pulses and the second level of scanning will represent another segment of the train of pulses having a continuous time relationship with the first segment of pulses. A significant example of the last-mentioned instance occurs in the case of apparatus generally known as loran which is employed to determine the location of a ship or an aircraft. In this type of apparatus a first series of pulses known as the master signal is transmitted from some land-based transmitter. At two other points, geographically removed from the above-mentioned transmitter, second and third receivers are located which receive this master signal and in response thereto transmit first and second slave signals. The master signal and the first and second slave signals each consist of the group of coded pulses which are received by ships at sea, which ships, from the time interval existing between the master signal and the first and second slave signals, can determine its geographic position accurately. In the operation of the loran receiving means located on the ship it is frequently desirable to view the master signal and the slave signals upon the screen of a cathode ray tube. On some occasions it is desirable that a continuous time picture of the received signal be portrayed. Under these circumstances it has been found that a single scan across the screen of the cathode ray tube results in a picture of the received signals that is too crowded together to observe the desired detail. Consequently, it is desirable to use more than one scanning trace with a continuous time base to portray the received signals. Thus, for example, the electron beam of the oscilloscope may scan the screen once and record received signals and then, without a break in time except for the small time required for flyback, scan the screen a second time and continue to record the received signals.

On the other hand, however, there are occasions when it is desirable to have one signal, the received master signal for example, shown on one scanning level and the locally generated simulated master signal shown on a second scanning level. In this last-mentioned case there would not be a continuous time relationship between the signals portrayed in the two scanning levels. Rather, each scanning level would show a separate, noncontinuous signal.

In the prior art there are many circuits which utilize more than one scanning level. The most common example is television which employs several hundred scanning levels in order to reproduce a picture. Generally speaking, successive scanning levels have a continuous time basis. Other prior art devices have a plurality of scanning levels which do not employ a continuous time base. However, it would make a definite improvement in the art to provide a circuit means which would provide both continuous time two-level scanning and also two-level scanning on an independent time basis.

A principal object of the invention is to provide a circuit means which will provide two-level scanning of a signal both on a continuous time basis and on an independent time basis.

A second object of the invention is a relatively simple and inexpensive circuit which will provide a dual sweep in a scope, said dual sweep portraying a signal which can either be time continuous between the two sweeps, or which can portray signals on the two sweeps which are noncontinuous in time, i.e., triggered by time unrelated triggering pulses.

A third object of the invention is the improvement of circuits for producing multiple scan visual portrayals of a screen of an oscilloscope.

In accordance with the invention a pair of input terminals is provided. When the circuit is used to provide a continuous time base presentation only a first of the input terminals is used. A trigger pulse is supplied on said first input terminal to a first flip-flop circuit which will respond thereto to assume a first of two stable states, which will be defined as the "on" condition. A saw-tooth wave sweep generator is responsive to the "on" condition of the first flip-flop circuit to initiate the generation of a saw-tooth waveform. When the saw-tooth waveform reaches a predetermined maximum position, a suitable trigger circuit, such as a Schmitt trigger circuit, functions to produce an output pulse which causes the said first flip-flop circuit to assume its "off" condition. A second flip-flop circuit is responsive to the switching of the flip-flop circuit to its "off" condition to switch from whatever state it's in to the other of its two stable states. Thus, the second flip-flop circuit will change states with each generated saw-tooth waveform so that a saw-tooth waveform will occur during each alternate state of the second flip-flop circuit. The alternate states of the second flip-flop circuit produce two different voltage levels which are applied to the vertical controls of the cathode ray tube so as to produce two levels of scanning of the screen of the cathode ray tube.

To provide for the two scans at different levels in response to a single input trigger pulse supplied to the first input terminal, a one-shot multivibrator is provided and is responsive to the change of state of said second flip-flop circuit, but only from a particular one of the two states to the other state. In response to such change of states of the second flip-flop circuit the one-shot multivibrator will produce a pulse, the trailing edge of which will function to cause the first flip-flop circuit to assume its "on" condition just as the originally received trigger pulse did. Thus, the one-shot multivibrator functions to produce a second trigger pulse which always occurs at a small predetermined time interval after the termination of the first scanning signal caused by the received trigger pulse. Such time interval is very small compared to the length of the scanning signal so that for practical purposes the two scanning signals are on a continuous time basis.

To enable the operation of the circuit on a two-level noncontinuous time basis there is provided a summing circuit, or adding circuit, which is constructed to be responsive to trigger signals supplied to both said first input terminal and the second input terminal to supply to a single output terminal thereof a signal equal to the sum of the received trigger pulses. Such output signal is supplied to the first flip-flop circuit. The trigger pulses received on the second input terminal, which can be trigger pulses of the slave signal, function to initiate scanning signals in the same manner that the trigger received on the first input terminal initiates a scanning signal. Switching means are provided to connect the summing circuit between the input terminals and the first flip-flop and to simultaneously disconnect the one-shot multivibrator from the circuit so that a single scanning signal is initiated only in response to a received trigger pulse on either the first or the second input terminal. Since scanning signals are initiated only by a received trigger pulse, it is apparent that a first trigger pulse at time $t_1$ would produce a scanning on one level of the oscilloscope screen at a time $t_1$ and then when a second trigger pulse arrived either on the first or second input terminal at a later time $t_2$ there would be initiated a scanning on the second level of the screen. Thus, the two scans are non-time-continuous.

The above-mentioned and other objects and features of the invention will be more fully understood from the following detailed description thereof when read in conjunction with the drawings in which:

FIGS. 2 through 7 show the voltage waveforms produced by the various blocks in FIG. 1 when the circuit is connected to produce a dual sweep function on a continuous time basis;

FIGS. 8 through 14 are forms showing the voltage waveforms at the output of the various blocks of FIG. 1 when the circuit is connected to produce a dual sweep function which has a noncontinuous time basis.

Figure 1:
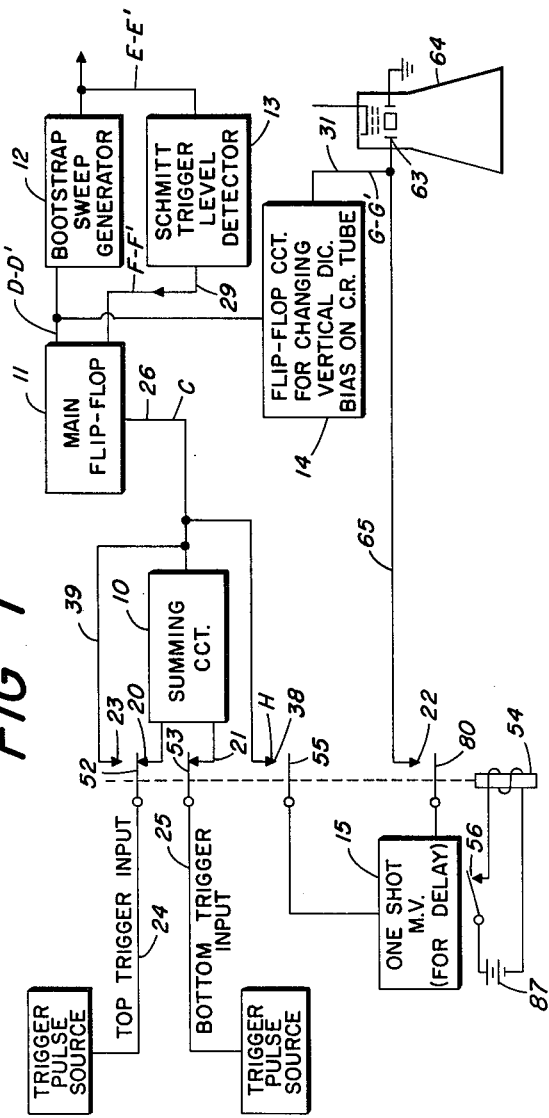
FIG. 1 shows a block diagram of the invention.

Referring now to FIG. 1, there will first be described in a general manner those portions of the circuit which are employed to provide a dual sweep signal on a continuous time basis. Then there will be described that portion of the circuitry shown in FIG. 1 employed to produce a dual sweep having a noncontinuous time basis.

Most of the circuitry shown in FIG. 1 is common to both forms of operation. The means by which the circuit of FIG. 1 is switched from one form of operation to the other is through the relay winding 54 which actuates arms 55, 53, and 52. When contacts 56 are open the relay winding 54 is de-energized and movable arms 52, 55, and 80 make with contacts 23, 38, and 22, respectively, the contacts 20 and 21 being open. Thus, the summing circuit 10 is shorted out by means of lead 39 and the one-shot multivibrator 15 is included in the circuit. Under these circumstances the circuit is adapted to produce a dual sweep representation on the oscilloscope screen on a continuous time basis.

On the other hand, when the switch 56 is closed and the relay winding 54 is energized, the arms 52 and 53 make with contacts 20 and 21 and the contacts 23, 38, and 22 are open. Under such conditions, the summing circuit 10 is connected into the circuit and the one-shot multivibrator is disconnected from the circuit. The circuit is now ready for operation on a noncontinuous time basis.

Returning again to the condition where relay winding 54 is de-energized it will be observed that the summing circuit 10 is no longer an active element in the circuit since contacts 20 and 21 are open and the upper input lead 24 is connected directly to the main flip-flop circuit 11, the lead 38 shunting out the summing circuit 10. The bottom input lead 25 is also disconnected from the circuit so that only trigger pulses appearing on input lead 24 have an effect upon the circuit. Such effect will now be described in some detail.

Assume that the trigger pulses appearing on the input lead 24 are represented by the pulses 57 and 49 of FIG. 2. Further, assume that this circuit is being used in a loran system and that the pulses 57 and 49 represent master trigger pulses. It will be understood that master signals and slave signals will occur in-between successive master trigger pulses, such as pulses 57 and 49, and that such master and slave signals will be shown on the screen of the oscilloscope during the two scannings thereon and on a continuous time basis.

The main flip-flop circuit 11 of FIG. 1 is constructed to respond to the trigger pulse 57 to change its stable state from a high level state 58 (FIG. 3) to a low level state 59 which low level state is defined herein as the "on" state of the flip-flop 11. The negative-going trailing edge 40 (FIG. 3) appearing at the output of the flip-flop circuit 11 functions to initiate the generation of a saw-tooth wave form in the generator circuit 12 of FIG. 1. Such saw-tooth waveform is represented by the waveform 41 of FIG. 4. When the amplitude of the waveform 41 reaches a predetermined maximum value 60, an appropriate voltage threshold sensitive circuit means, such as the Schmitt trigger circuit 13 of FIG. 1, responds thereto to produce an output signal 42, as shown in FIG. 5. Such output signal is supplied back to the main flip-flop circuit 11 via lead 29 and functions to cause the flip-flop circuit 11 to assume its "off" condition, as shown in FIG. 3 at time $t_1$.

A second flip-flop circuit 14 is constructed to be responsive to the positive-going edge 53 of the waveform of FIG. 3 to change to its "on" condition which is represented by the lower level 61 of the curve of FIG. 6. It will be seen later why the condition of the flip-flop circuit 14 had been in its "on" condition 62 just prior to time $t_1$.

It should be noted that the "on" condition of the flip-flop circuit 14 is represented by a voltage level of a certain magnitude of output lead 31 thereof. Such voltage is supplied to the vertical deflection electrodes 63 of a cathode ray tube 64 and will cause scanning to occur at specific levels across the screen of cathode ray tube. In the specific example being discussed, the level 62 of FIG. 6 represents the upper of the two scanning levels which will appear on the oscilloscope screen.

In order that the two scannings of the oscilloscope screen be time continuous there is provided a one-shot multivibrator 15 which is responsive to the output signal of the flip-flop circuit 14 appearing on lead 65 to produce a pulse 44, as shown in FIG. 7. The pulse 44 has a definite time duration which is short compared with the time duration of a sweep signal such as sweep signal 41 of FIG. 4. The flip-flop circuit 11 is constructed to respond to the trailing edge 45 of the pulse 44 to change from its "off" condition to its "on" condition at time $t_2$. Such a change will produce the negative-going edge 46 of the waveform of FIG. 3 which will function to initiate generation of a second saw-tooth waveform 47 (FIG. 4) in sweep generator 12 in the same manner as did the negative-going edge 40 of the curve of FIG. 3. Thus, the saw-tooth waveform 47 is generated and causes the pulse 66 of FIG. 5 to be generated in the Schmitt trigger circuit 13 when a predetermined magnitude is reached. The pulse 56 will cause the flip-flop 11 to assume its "off" condition at a time $t_3$, as shown in FIG. 3, which in turn will cause the flip-flop circuit 14 to assume its "off" condition at time $t_3$ as shown in FIG. 6.

The cycle is now complete and a circuit will not function again until another trigger pulse is supplied to the flip-flop circuit 11 from input lead 24. Thus, the time duration from $t_3$ to $t_4$, as shown in FIG. 3, can be of an indefinite period. However, when a second master trigger pulse, such as trigger pulse 49, occurs at time $t_4$ the operational cycle is re-initiated and will cause two additional saw-tooth sweep signals 67 and 68 to be generated in the same manner that saw-tooth waveforms 41 and 47 were generated; the two saw-tooth waveforms 67 and 68 being substantially time continuous, except for the very short duration of time required for fly-back.

Referring now to the operation of the circuit of FIG. 1 on a noncontinuous time basis, assume that the switch 56 is closed and that the relay 54 is energized by battery means 87. Under these circumstances arms 52 and 53 will make with contacts 20 and 21, and contacts 23, 38, and 22 will be open. Thus, the summing circuit 10 will connect both of the input leads 24 and 25 to the main flip-flop circuit 11 with the shunting lead 39 open-circuited. Also, the one-shot multivibrator 15 will be removed from the circuit. Under the foregoing conditions, trigger pulses appearing on both input leads 24 and 25 will be supplied to the main flip-flop circuit 11 through the summing circuit 10.

Referring now to FIGS. 8 and 9 there are shown trigger pulses which might be received on input leads 24 and 25, respectively. More specifically, the trigger pulses received on input lead 24 are represented by pulses 68 and 51 of FIG. 8 and the trigger pulses received on input lead 25 are represented by the trigger pulses 69 and 70 of FIG. 9. Continuing with the general application of the circuit to a loran system, assume that the trigger pulses 69 and 70 represent trigger pulses for slave signals being received whereas the trigger pulses 68 and 51 of FIG. 8 are representative of master signals being received.

In FIG. 10 there is shown the output of the summing circuit 10 which is simply the sum of the trigger pulses shown in FIGS. 8 and 9. Each of these trigger pulses will function to cause the main flip-flop circuit to assume its "on" condition, as shown in FIG. 11. More specifically, the trigger pulse 68' of FIG. 10 will cause the flip-flop circuit 11 of FIG. 1 to go from its "off" condition to its "on" position to time $t_0$ to produce a negative-going wave front 27. Such negative-going wavefront functions to initiate the generation of a saw-tooth waveform in the Schmitt trigger circuit 12, such saw-tooth waveform being represented by the waveform 32 of FIG. 12. When the amplitude of such waveform reaches a certain predetermined maximum value 71 the Schmitt trigger circuit 13 will respond thereto to produce a pulse 33 which, as discussed hereinbefore, is fed back to the main flip-flop circuit 11 to cause it to assume its "off" condition at time $t_1$. Flip-flop circuit 14 is constructed to respond to the positive-going wave front 72 of FIG. 11 to assume its "on" condition which is represented by the level 81 in FIG. 14.

Now, since the one-shot multivibrator 15 is disconnected from the circuit, there is no means whereby the flip-flop circuit 11 can be caused to assume its "on" condition again, except in response to another trigger pulse. Consequently, at time $t_2$ when the trigger pulse 69' is received on input lead 25 the main flip-flop circuit 11 will function to assume its "on" condition, as shown in FIG. 11, thus initiating the generation of another saw-tooth waveform 73 (FIG. 12) in sweep generator 12. The cycle of operation will then be the same as was just discussed in that the Schmitt trigger circuit will produce a pulse 74, as shown in FIG. 13, which will cause the main flip-flop circuit 11 to assume its "off" condition at time $t_3$, as shown in FIG. 11. The flip-flop circuit 14 will now respond to the positive-going wave front 75 of the waveform of FIG. 11 to assume its "off" condition which is represented by the level 76 of FIG. 14.

At the reception of another trigger pulse 51 of FIG. 8 a third saw-tooth waveform 77 will be generated, as shown in FIG. 12. It will be observed that the levels 76 and 81 of FIG. 14 are different for the two saw-tooth waveforms 73 and 77; that is to say, the output level of flip-flop circuit 14 will alternately assume its "on" and "off" conditions with each succeeding received trigger pulse whether it be received on input lead 24 or input lead 25; thus providing for a dual sweep representation on the oscilloscope screen with a noncontinuous time relationship between the two sweeps. In other words, the pulse 68 will produce a first scanning saw-tooth signal 71 of FIG. 12 and the circuit will then come to rest and will stay at rest until a second trigger pulse, such as trigger pulse 69 of FIG. 9 occurs, whereupon the circuit will generate a second saw-tooth waveform 73 and then again come to rest.

The operation of the switch 56 can be manual so that the operator can select either continuous time dual sweep operation or noncontinuous time dual sweep operation.

It is to be noted that the form of the invention shown and described herein is but a preferred embodiment thereof and that various changes may be made in the circuit arrangement without departing from the spirit or the scope of the invention.

I claim:

1. In a visual indicating means including cathode ray tube means, circuit means for selectively producing a time-continuous two-level scan or a time-noncontinuous two-level scan on the screen of the cathode ray tube means, comprising first input signal pulse means, first bistable means responsive to an input pulse to assume a first of two stable states, saw-tooth wave signal generating means responsive to the transistion of said first bistable means to its first stable state to initiate the generation of a saw-tooth wave signal, voltage threshold sensitive circuit means responsive to a predetermined level of amplitude of said saw-tooth wave signal to cause said first bistable means to assume its second stable state, second bistable means responsive to the transition of said first bistable means to its second stable state to assume its first stable state, pulse generating means responsive to the transition of said second bistable means to its first stable state to generate a pulse, said first bistable means responsive to said last-mentioned pulse to again assume its first stable state, second input signal pulse means, summing circuit means comprising input terminal means and output terminal means, and constructed to produce on its output terminal means the sum of the pulses supplied to its input terminal means, switching means constructed to disconnect said pulse generating means from the said circuit means and to connect said summing circuit between said first and second input signal pulse means and said first bistable means to supply to said first bistable means the summation of the first and second input signal pulses.

2. In a visual indicating means including cathode ray tube means, circuit means for producing a time-continuous two-level scan on the screen of the cathode ray tube means, comprising first input signal pulse means, first bistable means responsive to an input pulse to assume a first of two stable states, saw-tooth wave signal generating means responsive to the transition of said first bistable means to its first stable state to initiate the generation of a saw-tooth wave signal, voltage threshold sensitive circuit means responsive to a predetermined level of amplitude of said saw-tooth wave signal to cause said first bistable means to assume its second stable state, second bistable means responsive to the transition of said first bistable means to its second stable state to assume its first stable state, and pulse generating means responsive to the transition of said second bistable means to its first stable state to generate a pulse, said first bistable means responsive to said last-mentioned pulse to again assume its first stable state.

3. In an indicating means including cathode ray tube circuit means, means for selectively producing a time-noncontinuous two-level scan on the screen of said cathode ray tube means comprising first and second input signal terminals, adding means for combining input signal pulses supplied to said first and second input signal terminals, first bistable means responsive to a pulse of the combined input signal to assume a first of its two stable states, saw-tooth voltage waveform generating means responsive to the transition of said first bistable means to its first stable state to initiate the generation of a saw-tooth wave signal, threshold circuit means responsive to a predetermined level of amplitude of said saw-tooth wave voltage to cause said first bistable means to assume its second state, second bistable means responsive to the transition of said first bistable means to its second stable state to change to its stable state.

4. In a visual indicating means including cathode ray tube means comprising vertical and horizontal deflection means, circuit means for producing a time-continuous two-level scan on the screen of the cathode ray tube, comprising first input signal source means, first pulse-forming means having input terminal means and a plurality of output terminal means and constructed to be responsive to an input signal containing a given change of polarity supplied to said input terminal means to produce a saw-tooth voltage waveform on one of said output terminal means and to produce on a second output terminal means a two-level signal with alternate levels thereof occurring during successive ones of said saw-tooth waveforms, pulse generating means responsive to the transition of said two-level output signal from a given level to the other level to produce and supply to the input terminal means of said pulse-forming means a signal containing said given change of polarity, and means for supplying one of the output signals of said pulse-forming means to the vertical deflection means of said cathode ray tube means and the other output signal of said pulse-forming means to the horizontal deflection means of said cathode ray tube means.

5. In an indicating device in accordance with claim 4, means for producing a time-noncontinuous two-level scan on the screen of said cathode ray tube means comprising second input signal source means for supplying additional input signals, signal adding means having input terminal means and an output terminal means connected to the input terminal means of said pulse-forming means, and switching means for disconnecting said pulse generating means from the said circuit means, and for connecting the input terminal means of said signal adding means to the first and second input signal sources and the said output terminal means to the input terminal means of said pulse-forming means.

References Cited by the Examiner

UNITED STATES PATENTS

| 2,435,207 | 2/48 | Dimond | 315—24 X |
| 2,879,412 | 3/59 | Hoge et al. | 331—145 X |

OTHER REFERENCES

"Overcoming Spot Delay in a Cathode Ray Tube" (Brown and Smith), published by IBM (Technical Disclosure Bulletin), vol. 1, No. 2, August 1958.

DAVID G. REDINBAUGH, *Primary Examiner.*

RALPH G. NILSON, *Examiner.*